US012466182B2

(12) United States Patent
Shima

(10) Patent No.: US 12,466,182 B2
(45) Date of Patent: Nov. 11, 2025

(54) LIQUID DISCHARGE APPARATUS

(71) Applicant: Akihiro Shima, Kanagawa (JP)

(72) Inventor: Akihiro Shima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 287 days.

(21) Appl. No.: 18/323,633

(22) Filed: May 25, 2023

(65) Prior Publication Data

US 2023/0391078 A1 Dec. 7, 2023

(30) Foreign Application Priority Data

Jun. 2, 2022 (JP) ................................ 2022-090291

(51) Int. Cl.
*B41J 2/14* (2006.01)
*B41J 2/045* (2006.01)

(52) U.S. Cl.
CPC ............ *B41J 2/14* (2013.01); *B41J 2/04501* (2013.01); *B41J 2202/02* (2013.01)

(58) Field of Classification Search
CPC ...... B41J 2/14; B41J 2/04501; B41J 2202/02; B41J 29/377; B41J 29/38; B41J 2/01; B41J 2/02; B41J 2/135; B41J 2/14008; B41J 2/14016; B41J 2/14201; B41J 2/14314
See application file for complete search history.

(56) References Cited

U.S. PATENT DOCUMENTS

| | | | | |
|---|---|---|---|---|
| 10,688,811 | B2 * | 6/2020 | Nishimura | F24H 3/02 |
| 11,628,668 | B2 * | 4/2023 | Yoda | B41J 11/00244 347/17 |
| 2022/0032661 | A1 * | 2/2022 | Suzuki | B41J 11/00216 |

FOREIGN PATENT DOCUMENTS

| | | |
|---|---|---|
| JP | 2009-137227 | 6/2009 |
| JP | 2010-179626 | 8/2010 |
| JP | 2017-213712 | 12/2017 |
| JP | 2018-158545 | 10/2018 |

* cited by examiner

*Primary Examiner* — Kristal Feggins
(74) *Attorney, Agent, or Firm* — IPUSA, PLLC

(57) ABSTRACT

A liquid discharge apparatus includes a conveyance path, a conveyor, and a liquid discharger. The conveyor conveys a medium in a conveyance direction along the conveyance path. The liquid discharger is disposed above the conveyance path to discharge a liquid toward the medium conveyed by the conveyor. The liquid discharger includes a discharge head, a housing, an airflow generator, and slit. The discharge head has a nozzle from which the liquid is discharged. The housing accommodates the discharge head. The housing has a lower face from which the nozzle of the discharge head is exposed and a slit adjacent to the discharge head in the lower face of the housing. The airflow generator generates an airflow flowing through the housing and discharged from the slit toward the conveyance path.

14 Claims, 10 Drawing Sheets

LIQUID DISCHARGE APPARATUS

CROSS-REFERENCE TO RELATED APPLICATION

This patent application is based on and claims priority pursuant to 35 U.S.C. § 119(a) to Japanese Patent Application No. 2022-090291, filed on Jun. 2, 2022, in the Japan Patent Office, the entire disclosure of which is hereby incorporated by reference herein.

BACKGROUND

Technical Field

Embodiments of the present disclosure relate to a liquid discharge apparatus.

Related Art

In the related art, an inkjet printer includes a conveyor and an ink discharge unit. The conveyor conveys a medium in a conveyance direction along a conveyance path. The ink discharge unit is disposed above the conveyance path to discharge ink toward the medium conveyed by the conveyor.

SUMMARY

Embodiments of the present disclosure describe an improved liquid discharge apparatus that includes a conveyance path, a conveyor, and a liquid discharger. The conveyor conveys a medium in a conveyance direction along the conveyance path. The liquid discharger is disposed above the conveyance path to discharge a liquid toward the medium conveyed by the conveyor. The liquid discharger includes a discharge head, a housing, an airflow generator, and slit. The discharge head has a nozzle from which the liquid is discharged. The housing accommodates the discharge head. The housing has a lower face from which the nozzle of the discharge head is exposed and a slit adjacent to the discharge head in the lower face of the housing. The airflow generator generates an airflow flowing through the housing and discharged from the slit toward the conveyance path.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
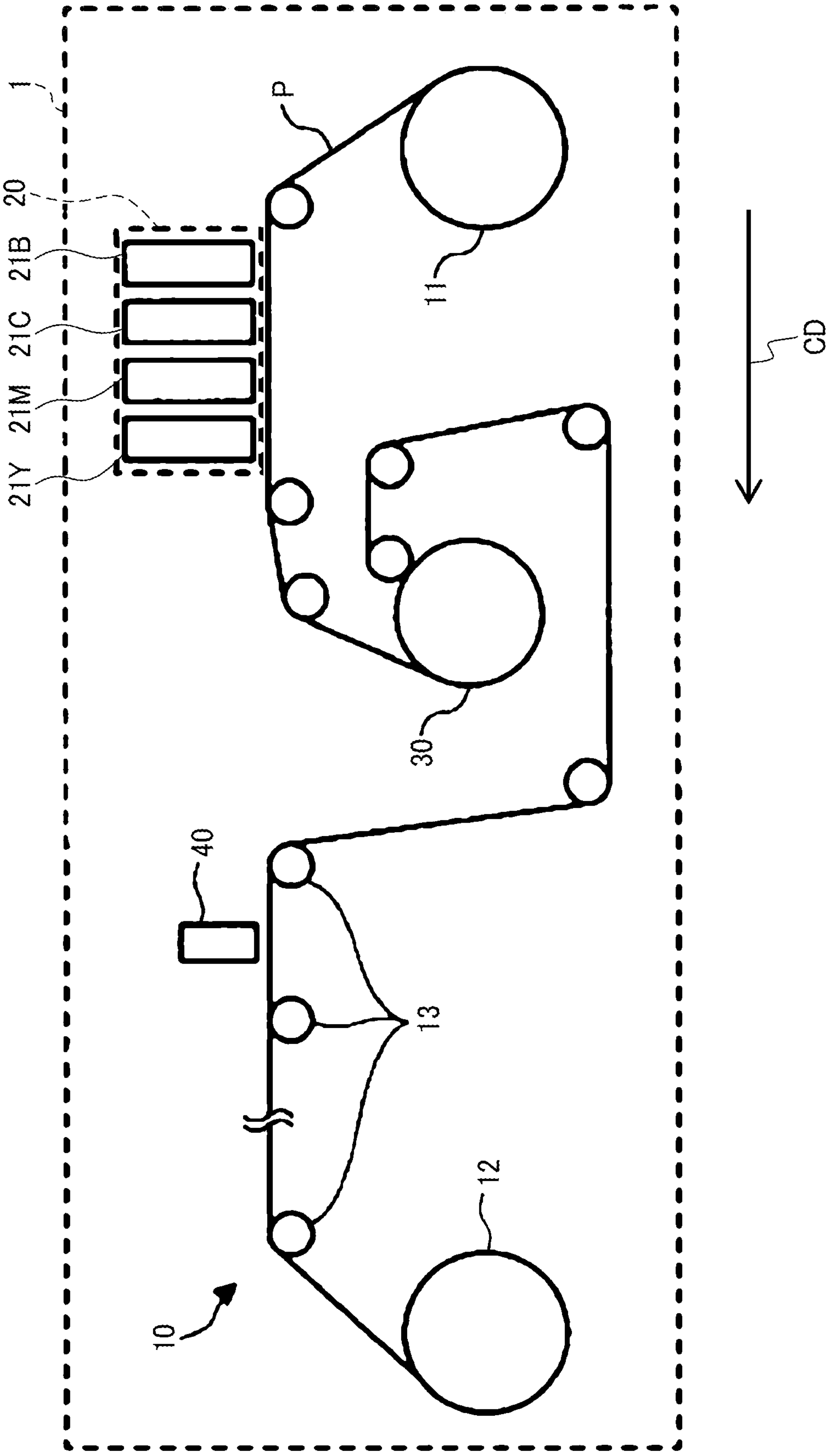
FIG. 1 is a schematic diagram illustrating an overall configuration of an inkjet printer according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise.

An inkjet printer 1 according to an embodiment of the present disclosure is described below with reference to the drawings. FIG. 1 is a schematic diagram illustrating an overall configuration of the inkjet printer 1. The inkjet printer 1 is an example of a liquid discharge apparatus that discharge ink, which is an example of a liquid, toward a sheet to form an image on the sheet. As illustrated in FIG. 1, the inkjet printer 1 includes a conveyor 10, an ink discharge unit 20 (i.e., a liquid discharger), a dryer 30, and an image inspection unit 40.

The conveyor 10 conveys a belt-shaped continuous sheet P (i.e., a medium) along a conveyance path in a conveyance direction. More specifically, the conveyor 10 conveys the continuous sheet P along the conveyance path extending from an unwinder 11 to a rewinder 12 via the ink discharge unit 20, the dryer 30, and the image inspection unit 40. The conveyor 10 includes the unwinder 11, the rewinder 12, and multiple guide rollers 13.

The continuous sheet P before an image is formed is wound around the unwinder 11. The unwinder 11 is supported by a frame of the inkjet printer 1 and rotatable in a direction to feed the wound continuous sheet P. The continuous sheet P on which the image has been formed is wound around the rewinder 12. The rewinder 12 is supported by the frame of the inkjet printer 1 and rotatable in a direction to wind the continuous sheet P on which an image has been formed. The multiple guide rollers 13 are arranged between the unwinder 11 and the rewinder 12 at predetermined intervals in the conveyance direction. The guide roller 13 rotates in contact with the continuous sheet P to be wound by the rewinder 12 to guide the continuous sheet P and apply a predetermined tension to the continuous sheet P.

The conveyance path is a space through which the continuous sheet P passes in the inkjet printer 1. An upper guide plate and a lower guide plate may be disposed along at least a portion of the conveyance path to define an upper wall and a lower wall of the conveyance path. The conveyance path is curved or bent inside the inkjet printer 1. That is, the “conveyance direction” in the present specification changes depending on a position along the conveyance path. However, the conveyance direction at a position facing the ink discharge unit 20 is a horizontal direction (direction from right to left in FIG. 1) indicated by arrow CD in FIG. 1. Among directions along the surface of the continuous sheet P, a direction orthogonal to the conveyance direction is referred to as a "width direction (main scanning direction)."

In the present embodiment, the belt-shaped continuous sheet P is described as an example of the medium, but a cut sheet cut to a predetermined size (for example, A4 size, B5 size, or the like) may be used as the medium. In such a case, the inkjet printer 1 may include a sheet feeding tray instead of the unwinder 11 and a sheet ejection tray instead of the rewinder 12. A specific example of a material (medium) onto which liquid can adhere is not limited to paper, and may be an overhead projector (OHP) transparency, thread, fiber, fabric, leather, metal, plastic, or the like.

The ink discharge unit 20 is disposed downstream from the unwinder 11 and upstream from the dryer 30 in the conveyance direction. The ink discharge unit 20 is disposed above the horizontally extending portion of the conveyance path so as to face the conveyance path. The ink discharge unit 20 includes multiple line heads 21B, 21C, 21M, and 21Y that discharge inks of different colors (black, cyan, magenta, and yellow). The multiple line heads 21B, 21C, 21M, and 21Y are arranged in the conveyance direction. The line heads 21B, 21C, 21M, and 21Y have the same configuration except that the colors of ink to be discharged are different from each other, and thus these line heads may be collectively referred to as "line heads 21," and each of these line heads may be referred to as a "line head 21" unless distinguished. The configuration of the line head 21 is described later with reference to FIGS. 2A to 3B.

The dryer 30 is disposed downstream from the ink discharge unit 20 and upstream from the image inspection unit 40 in the conveyance direction. The dryer 30 dries ink adhering to the continuous sheet P. The dryer 30 is, for example, a heater that contacts the continuous sheet P to heat the continuous sheet P or a blower that blows hot air toward the continuous sheet P. The dryer 30 can be omitted.

The image inspection unit 40 faces the conveyance path downstream from the dryer and upstream from the rewinder 12 in the conveyance direction. The image inspection unit 40 inspects whether an image is appropriately formed on the continuous sheet P. The image inspection unit 40 is, for example, a camera that captures an image of the surface of the continuous sheet P. The image inspection unit 40 can be omitted.

Figure 2A:
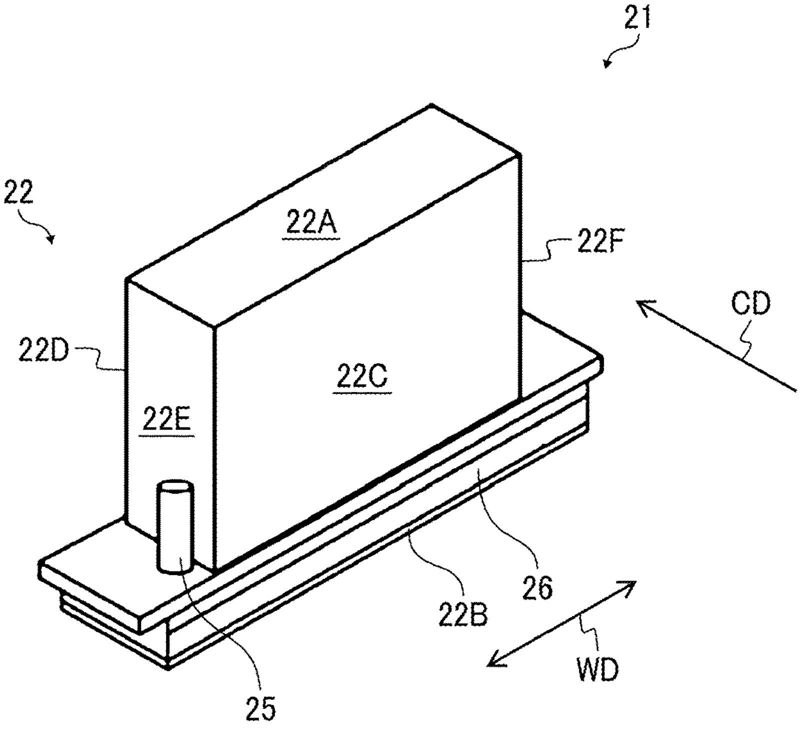
FIG. 2A is an external perspective view of a line head of the inkjet printer in FIG. 1.
Figure 2B:
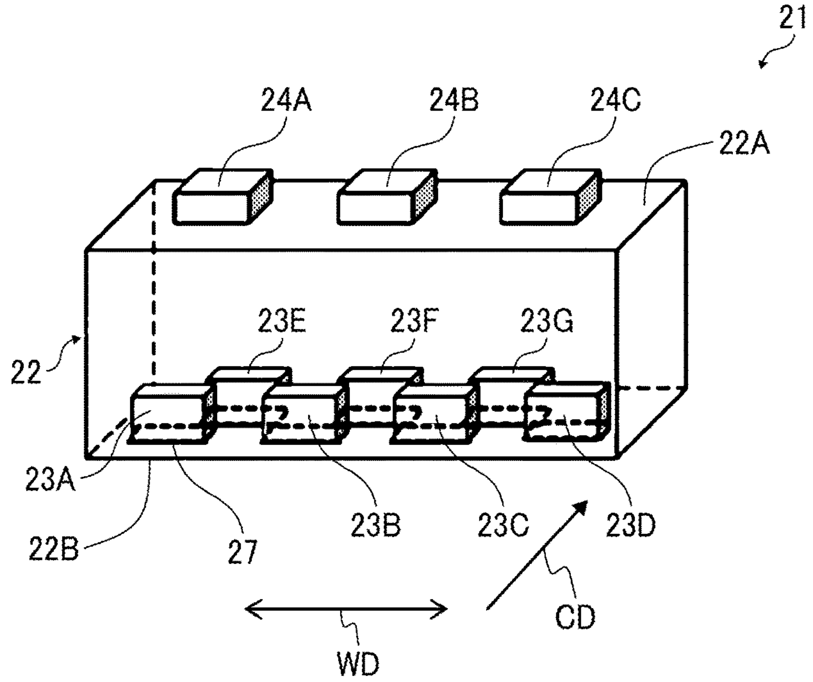
FIG. 2B is an internal perspective view of the line head.
Figure 3A:
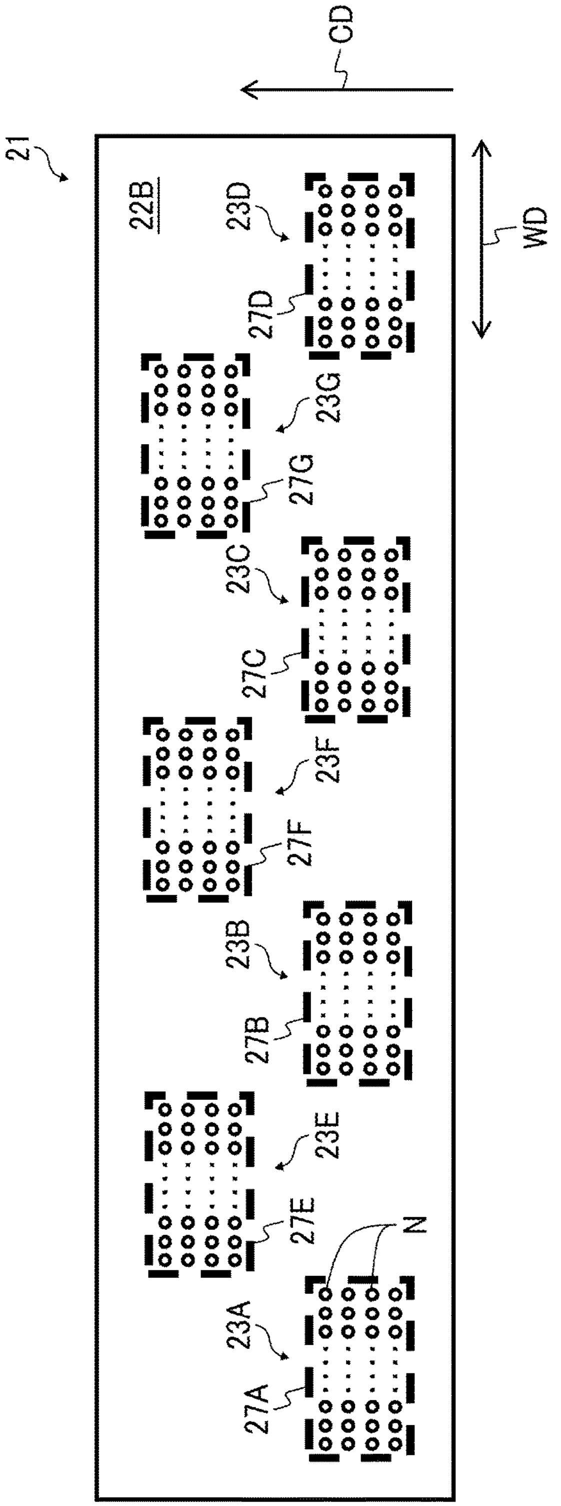
FIGS. 3A and 3B are bottom views of the line head.
Figure 3B:
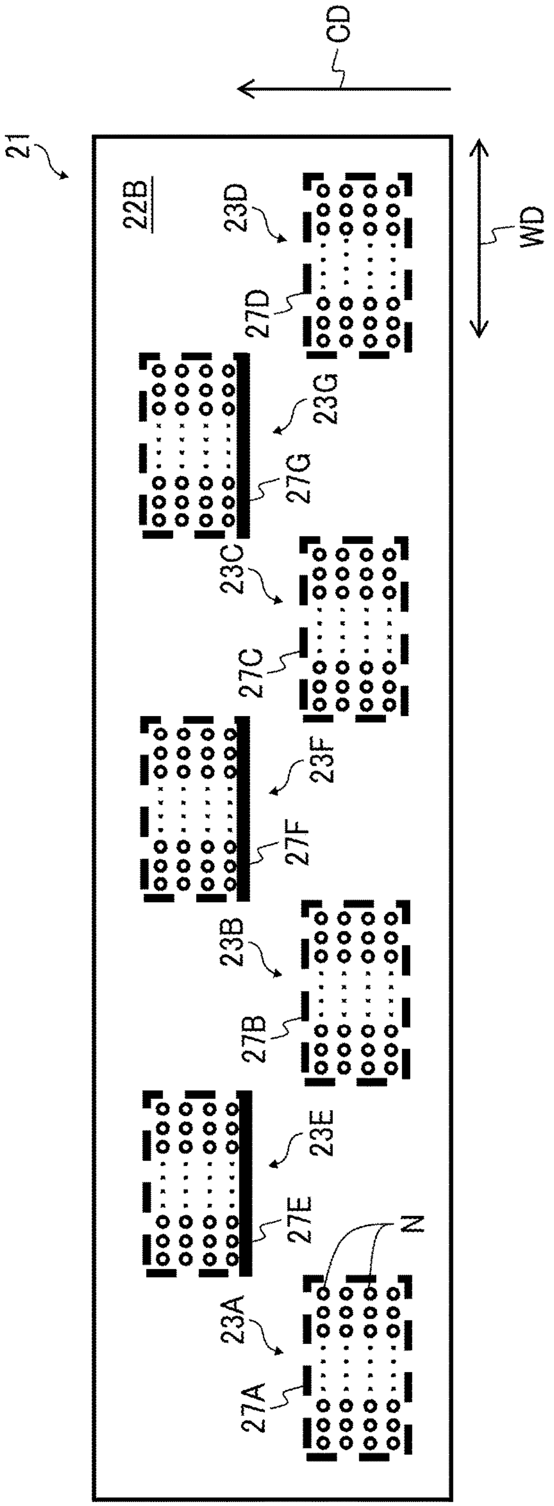

FIG. 2A is an external perspective view of the line head 21, and FIG. 2B is an internal perspective view of the line head 21. FIGS. 3A and 3B are bottom views of the line head 21. As illustrated in FIGS. 2A to 3B, the line head 21 includes a housing 22, multiple discharge heads 23A, 23B, 23C, 23D, 23E, 23F, and 23G (hereinafter, these discharge heads may be collectively referred to as "discharge heads 23," each of which may be referred to as a "discharge head 23" unless distinguished), and multiple fans 24A, 24B, and 24C (hereinafter, these fans may be collectively referred to as "fans 24," each of which may be referred to as a "fan 24" unless distinguished). Each of the multiple discharge heads 23A, 23B, 23C, 23D, 23E, 23F, and 23G is unitized as a single unit.

The housing 22 has a substantially rectangular parallelepiped outer shape. That is, the housing 22 has an upper face 22A, a lower face 22B, and four side faces 22C, 22D, 22E, and 22F disposed between the upper face 22A and the lower face 22B. The upper face 22A is opposed to the lower face 22B in a vertical direction in FIGS. 2A and 2B. The side faces 22C and 22D are opposed to each other in the conveyance direction indicated by arrow CD in the drawings. The side faces 22E and 22F are opposed to each other in the width direction indicated by arrow WD in the drawings. The housing 22 has a box shape having an internal space defined by the upper face 22A, the lower face 22B, and the side faces 22C to 22F.

Each of the discharge heads 23 includes multiple nozzles N from which ink is discharged onto the continuous sheet P on the conveyance path. The ink is supplied to each of the discharge heads 23 through an ink supply port 25 and a channel substrate 26 illustrated in FIG. 2A. As illustrated in FIG. 2B, the housing 22 accommodates the discharge heads 23 in the internal space thereof. As illustrated in FIGS. 3A and 3B, the nozzles N of the discharge head 23 are exposed from the lower face 22B of the housing 22. That is, the nozzles N are disposed above the conveyance path so as to face the conveyance path. The multiple nozzles N are arranged at predetermined intervals in the conveyance direction and the width direction.

The discharge heads 23A, 23B, 23C, and 23D are arranged in the width direction in a row at predetermined intervals. Similarly, the discharge heads 23E, 23F, 23G are arranged in the width direction in a row at predetermined intervals. In addition, each of the discharge heads 23E to 23G is disposed between the adjacent two of the discharge heads 23A to 23D in the width direction and downstream from the discharge heads 23A to 23D in the conveyance direction. In other words, the discharge heads 23A to 23G are arranged in a staggered manner along the lower face 22B of the housing 22. The discharge heads 23A, 23B, 23C, and 23D are examples of a first discharge head, and the discharge heads 23E, 23F, and 23G are examples of a second discharge head.

The fans 24 are attached to the upper face 22A of the housing 22. That is, the fans 24 are disposed directly above the discharge heads 23. In other words, when the line head 21 is viewed in plan view in the vertical direction, the fan 24 is disposed at a position overlapping the discharge head 23. The fan 24 adjusts a volume of an airflow to be generated under control (e.g., a magnitude of current supplied to the fan 24) of a controller 100 which is described later. The fan 24 is an example of an airflow generator that generates an airflow inside the housing 22. However, a specific example of the airflow generator is not limited to the fan 24, and may be a blower or the like.

The fans 24A and 24C are examples of a positive pressure generator that generates an airflow to increase a pressure of an air inside the housing 22. In other words, the fans 24A and 24C supply the air into the housing 22. The fan 24B is an example of a negative pressure generator that generates an airflow to decrease the pressure of the air inside the housing 22. In other words, the fan 24B discharges the air from the internal space of the housing 22. For example, the fan 24A or 24C may be attached upside down to the upper face 22A to function as the fan 24B serving as the negative pressure generator.

The fans 24A and 24C according to the present embodiment are disposed at two positions separated from each other in the width direction. The fan 24B is disposed between the fans 24A and 24C in the width direction. That is, the line head 21 includes the positive pressure generator and the negative pressure generator alternately arranged in the width direction. Further, the number of the positive pressure generators is greater than the number of the negative pressure generators. As a result, the air inside the housing 22 is maintained at a positive pressure. However, the method of maintaining the air in the internal space of the housing 22 at a positive pressure is not limited to the difference in the number of the positive pressure generators and the number of the negative pressure generators. In another method, the volume of airflow generated by the positive pressure generators is larger than the volume of airflow generated by the negative pressure generator to maintain the air in the internal space of the housing 22 at a positive pressure.

As indicated by broken lines in FIG. 3A, slits 27A, 27B, 27C, 27D, 27E, 27F, and 27G (hereinafter, these slits may be collectively referred to as "slits 27," each of which may be referred to as a "slit 27" unless distinguished) are formed in the lower face 22B of the housing 22. The slits 27 penetrate through the lower face 22B in a thickness direction. That is, the air in the internal space of the housing 22 is discharged downward through the slits 27. In other words, the slits 27 discharge the air in the internal space of the housing 22 downward as a descending airflow toward the conveyance path. The internal space of the housing 22 is maintained at a positive pressure.

Each of the slits 27A to 27G according to the present embodiment surrounds the multiple nozzles N of each of the multiple discharge heads 23A to 23G, respectively. In other words, each of the slits 27A to 27G according to the present embodiment is consecutively arranged around a periphery of the multiple nozzles N in a frame shape. However, the layout of the slit 27 is not limited to the example illustrated in FIGS. 3A and 3B.

Figure 4:
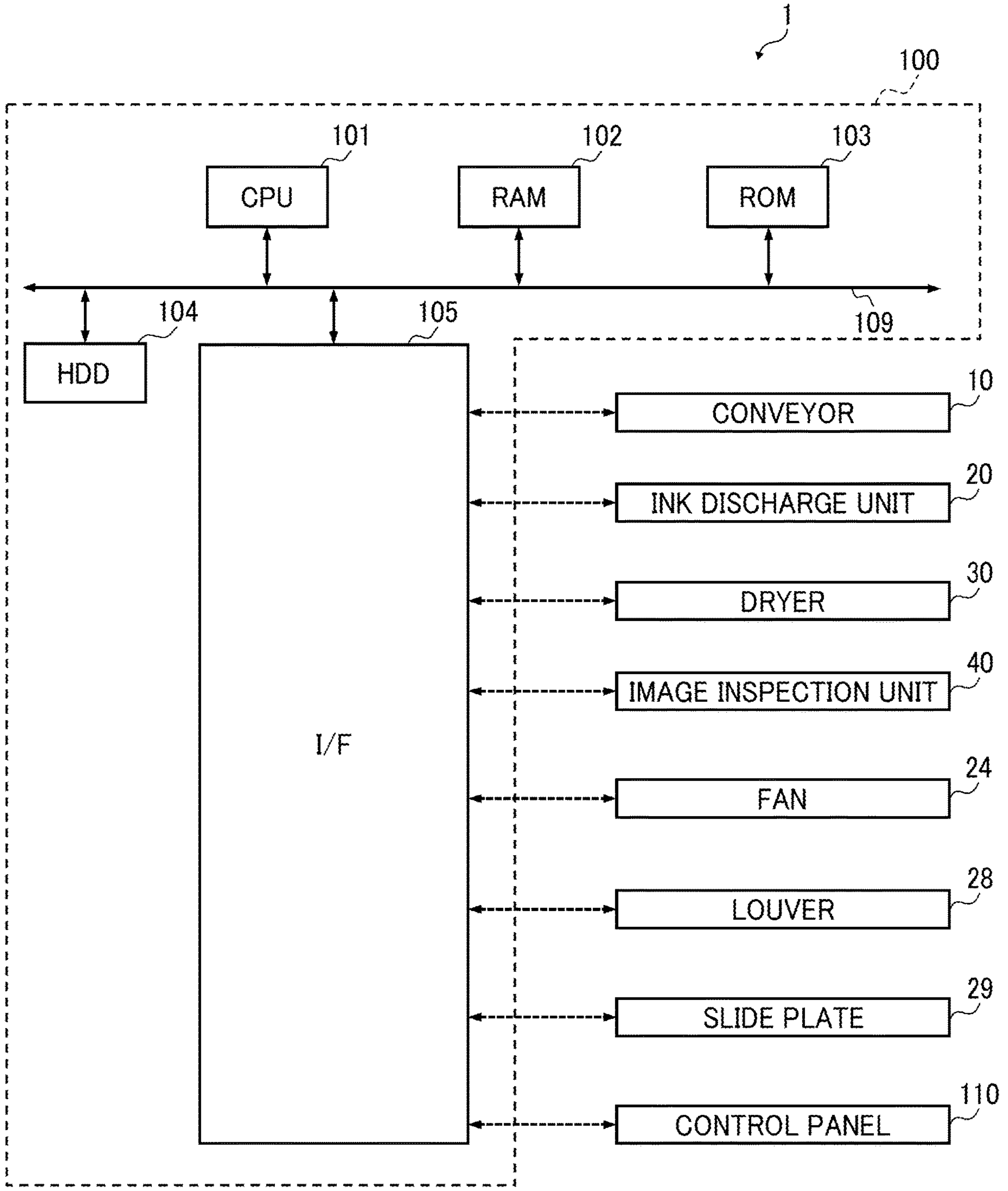
FIG. 4 is a block diagram illustrating a hardware configuration of the inkjet printer.

The line head 21 includes a plate-shaped louver 28 (see FIG. 4). The louver 28 is accommodated in the internal space of the housing 22 so as to face the fans 24A and 24C. The louver 28 adjusts (changes) a direction of the airflow generated by the fans 24A and 24C under control of the controller 100. The louver 28 is an example of an airflow direction adjuster. However, the method of adjusting the direction of the airflow generated by the fans 24A and 24C is not limited to the louver 28. In another method, the fans 24A and 24C may change orientations thereof to adjust the direction of the airflow.

The line head 21 further includes a slide plate 29 (see FIG. 4). The slide plate 29 slides along the lower face 22B of the housing 22 under control of the controller 100 to adjust (increase or decrease) an opening area of the slit 27. The slide plate 29 is an example of an opening area adjuster. However, a specific method of adjusting the opening area of the slit 27 is not limited to the slide plate 29.

FIG. 4 is a block diagram illustrating a hardware configuration of the inkjet printer 1. As illustrated in FIG. 4, the inkjet printer 1 includes a central processing unit (CPU) 101, a random access memory (RAM) 102, a read only memory (ROM) 103, a hard disk drive (HDD) 104, and an interface (I/F) 105. The CPU 101, the RAM 102, the ROM 103, the HDD 104, and the I/F 105 are connected to each other via a common bus 109.

The CPU 101 is an arithmetic device and controls operations of the entire inkjet printer 1. The RAM 102 is a volatile storage medium that allows data to be read and written at high speed. The CPU 101 uses the RAM 102 as a work area for data processing. The ROM 103 is a non-volatile read only storage medium and stores programs such as firmware. The HDD 104 is a non-volatile storage medium with large storage capacity, in which data is read and written, and stores an operating system (OS), various control programs, application programs, and the like.

In the inkjet printer 1, the CPU 101 executes a control program stored in the ROM 103, a data-processing program (application program) loaded into the RAM 102 from a recording medium such as the HDD 104, and the like using an arithmetic function. Such programs executed by the CPU 101 configures a software control unit including various functional modules of the inkjet printer 1. The software control unit thus configured and the hardware resources installed in the inkjet printer 1, in combination, construct functional blocks that implement the function of the inkjet printer 1. That is, the CPU 101, the RAM 102, the ROM 103, the HDD 104, and the I/F 105 construct the controller 100 that controls the operation of the inkjet printer 1.

The I/F 105 connects the conveyor 10, the ink discharge unit 20, the dryer 30, the image inspection unit 40, the fan 24, the louver 28, the slide plate 29, and a control panel 110 to the common bus 109. The controller 100 operates the conveyor 10, the ink discharge unit 20, the dryer 30, the image inspection unit 40, the fan 24, the louver 28, and the slide plate 29 via the I/F 105.

The control panel 110 includes an operation device that receives instructions from a user and a display serving as a notifier that notifies the user of information. The operation device includes, for example, hard keys and a touch panel overlaid on a display. The control panel 110 acquires information from the user through the operation device and provides information to the user through the display. Note that a specific example of the notifier is not limited to the display and may be a light emitting diode (LED) lamp or a speaker.

Figure 5:
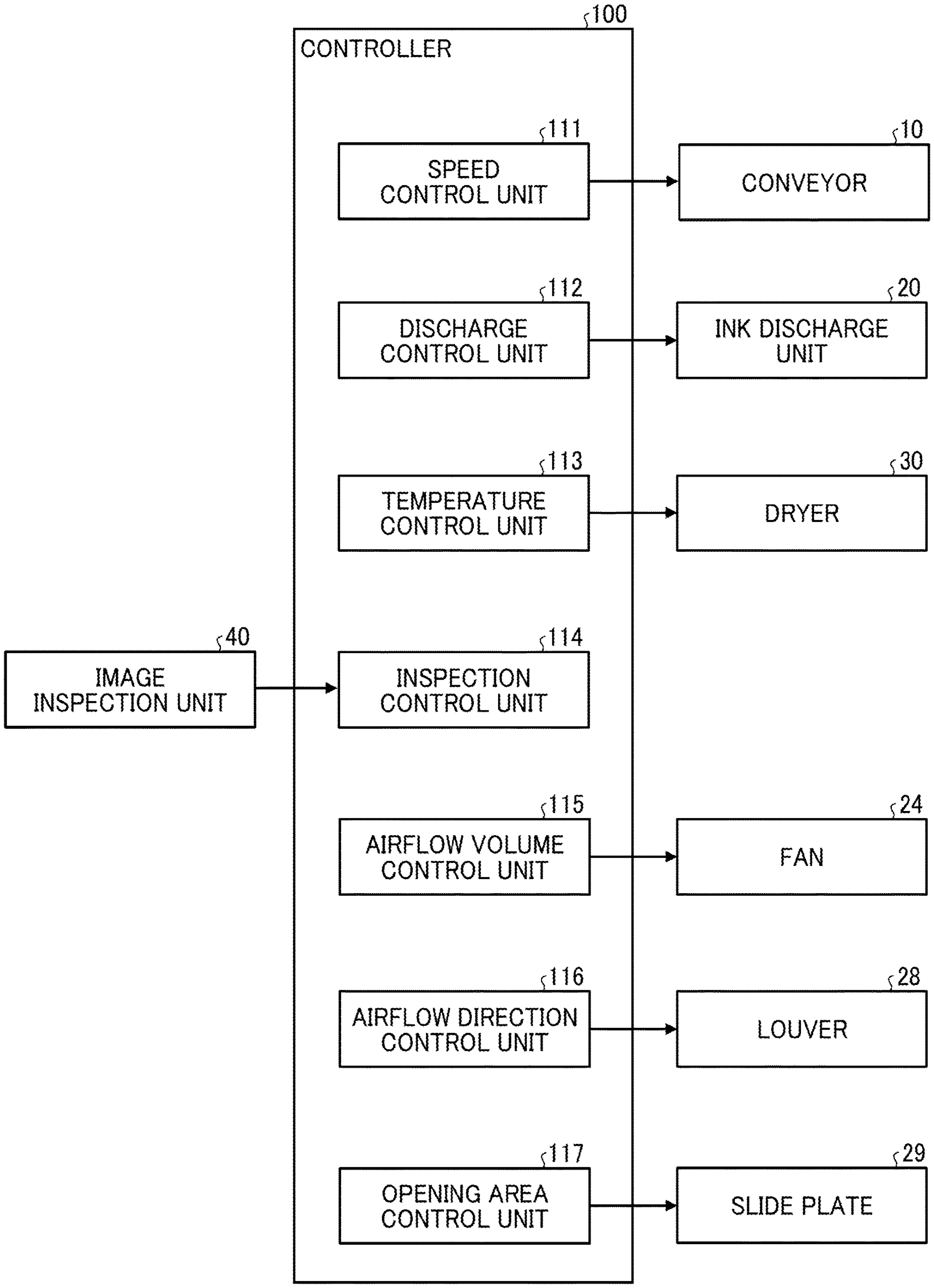
FIG. 5 is a functional block diagram of a controller of the inkjet printer.

FIG. 5 is a functional block diagram of the controller 100. The controller 100 includes a speed control unit 111, a discharge control unit 112, a temperature control unit 113, an inspection control unit 114, an airflow volume control unit 115, an airflow direction control unit 116, and an opening area control unit 117. Each of the functional blocks 111 to 117 is implemented by programs executed by the CPU 101. The programs are stored in the ROM 103 or the HDD 104.

The controller 100 forms an image on the continuous sheet P in response to an image forming instruction. The image forming instruction includes at least image data indicating an image to be formed on the continuous sheet P.

The controller 100 may acquire the image forming instruction from a user via the control panel 110 or may acquire from an external device via a communication network. Then, the controller 100 calculates a printing rate based on the image data included in the image forming instruction. The printing rate indicates an amount of liquid discharged from the nozzles N toward the continuous sheet P. More specifically, the printing rate indicates an amount of ink discharged per a unit area of the continuous sheet P.

The speed control unit 111 controls a conveyance speed of the continuous sheet P by the conveyor 10. For example, the speed control unit 111 decreases the conveyance speed of the continuous sheet P with an increase in the printing rate. The speed control unit 111, for example, adjusts the magnitude of current supplied to a motor that rotates the rewinder 12 to control the conveyance speed. The discharge control unit 112 causes the line heads 21B, 21C, 21M, and 21Y to discharge ink at a predetermined timing so as to form an image instructed by the image forming instruction on the continuous sheet P. For example, the discharge control unit 112 applies a voltage to each of piezoelectric elements mounted on the discharge head 23 to discharge ink from the corresponding nozzle N. The piezoelectric elements correspond to the nozzles N, respectively.

The temperature control unit 113 controls a temperature of the dryer 30. For example, the temperature control unit 113 increases the temperature of the dryer 30 with an increase in the printing rate. The inspection control unit 114 determines whether a desired image is formed on the continuous sheet P based on an image captured by the image inspection unit 40. When the inspection control unit 114 determines that the desired image is not formed, the inspection control unit 114 may notify a user of an error via the control panel 110, and then may correct an image to be formed on the continuous sheet P.

The airflow volume control unit 115, for example, adjusts the magnitude of current supplied to the fan 24 to control the volume of the airflow generated by the fan 24. The volume of the airflow indicates an airflow rate per unit time generated by the fan 24. Processes executed by the airflow volume control unit 115 are described later in detail with reference to FIG. 6. The airflow direction control unit 116, for example, swings the louver 28 to control the direction of the airflow generated by the fan 24. Processes executed by the airflow direction control unit 116 are described later in detail with reference to FIG. 7. The opening area control unit 117, for example, slides the slide plate 29 to control the opening area of the slit 27. Processes executed by the opening area control unit 117 are described later in detail with reference to FIG. 8.

First, the temperature control unit 113 controls the dryer 30 at a desired temperature in response to the image forming instruction. The speed control unit 111 causes the conveyor 10 to start conveying the continuous sheet P at a predetermined speed in response to the dryer 30 reaching the desired temperature. The discharge control unit 112 causes the ink discharge unit 20 to discharge ink at a predetermined timing toward the continuous sheet P conveyed by the conveyor 10. As a result, an image instructed by the image forming instruction is formed on the continuous sheet P. The inspection control unit 114 causes the image inspection unit 40 to inspect the image formed on the continuous sheet P. The airflow volume control unit 115, the airflow direction control unit 116, and the opening area control unit 117 execute the processes illustrated in FIGS. 6 to 8 during a period from when the controller 100 receives the image forming instruction to when the controller 100 finishes forming the image on the continuous sheet P.

Figure 6:
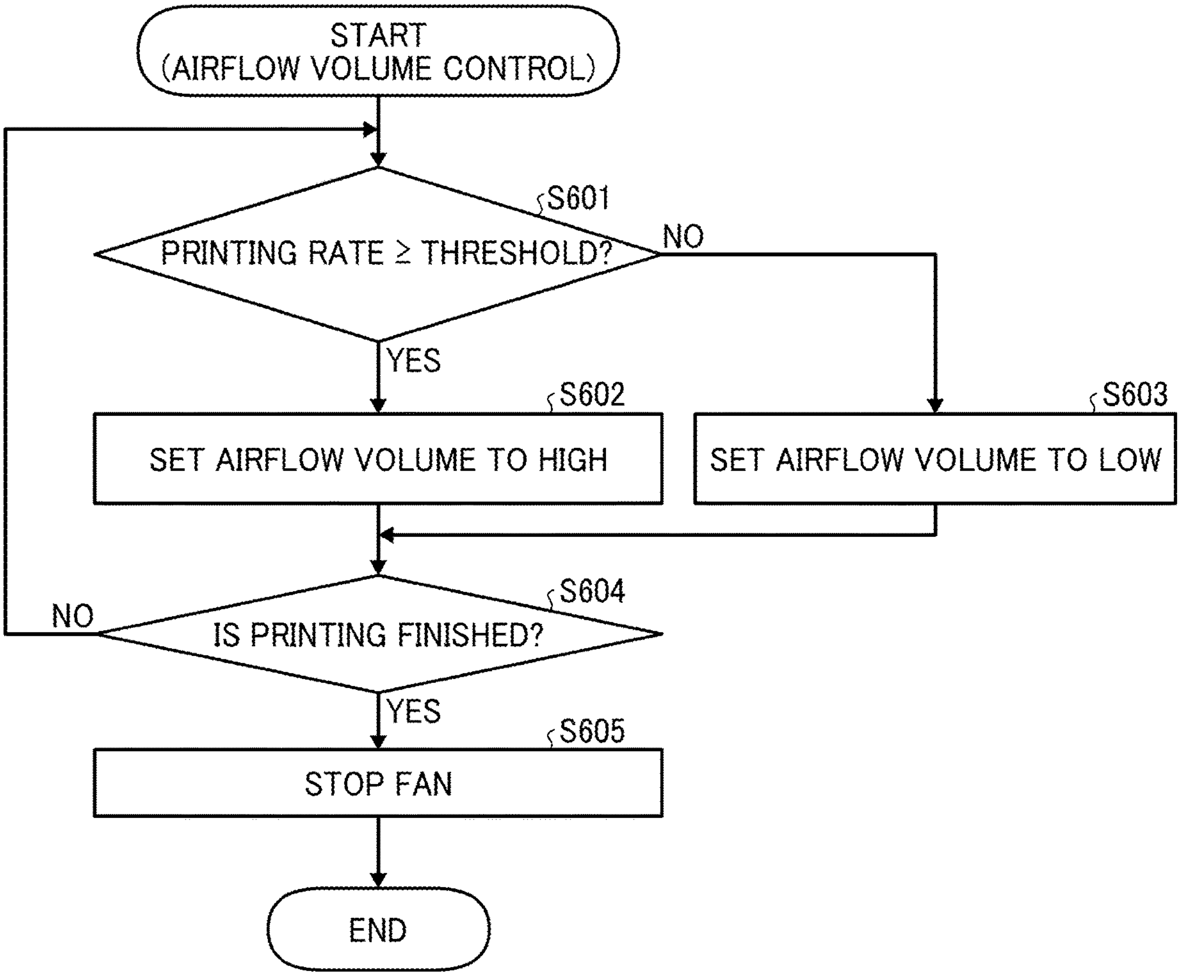
FIG. 6 is a flowchart of an airflow volume control according to an embodiment of the present disclosure.

FIG. 6 is a flowchart of processes of an airflow volume control. The airflow volume control unit 115 compares the printing rate with a predetermined threshold (step S601). When the printing rate is equal to or larger than the threshold (Yes in step S601), the airflow volume control unit 115 sets an airflow volume of the fan 24 to "high (i.e., a first airflow volume)" (step S602). On the other hand, when the printing rate is less than the threshold (No in step S601), the airflow volume control unit 115 sets the airflow volume of the fan 24 to "low (i.e., a second airflow volume)" (step S603). The second airflow volume is smaller than the first airflow volume. Then, the airflow volume control unit 115 rotates the fan 24 so as to generate the airflow at the airflow volume set in steps S602 and S603.

The airflow volume control unit 115 repeats the processes in steps S601 to S603 to cause the fan 24 to generate the airflow at the airflow volume corresponding to the printing rate until the controller 100 finishes the printing on the continuous sheet P (No in step S604). When the controller 100 finishes the printing on the continuous sheet P (Yes in step S604), the airflow volume control unit 115 stops the fan 24 (step S605).

Figure 7:
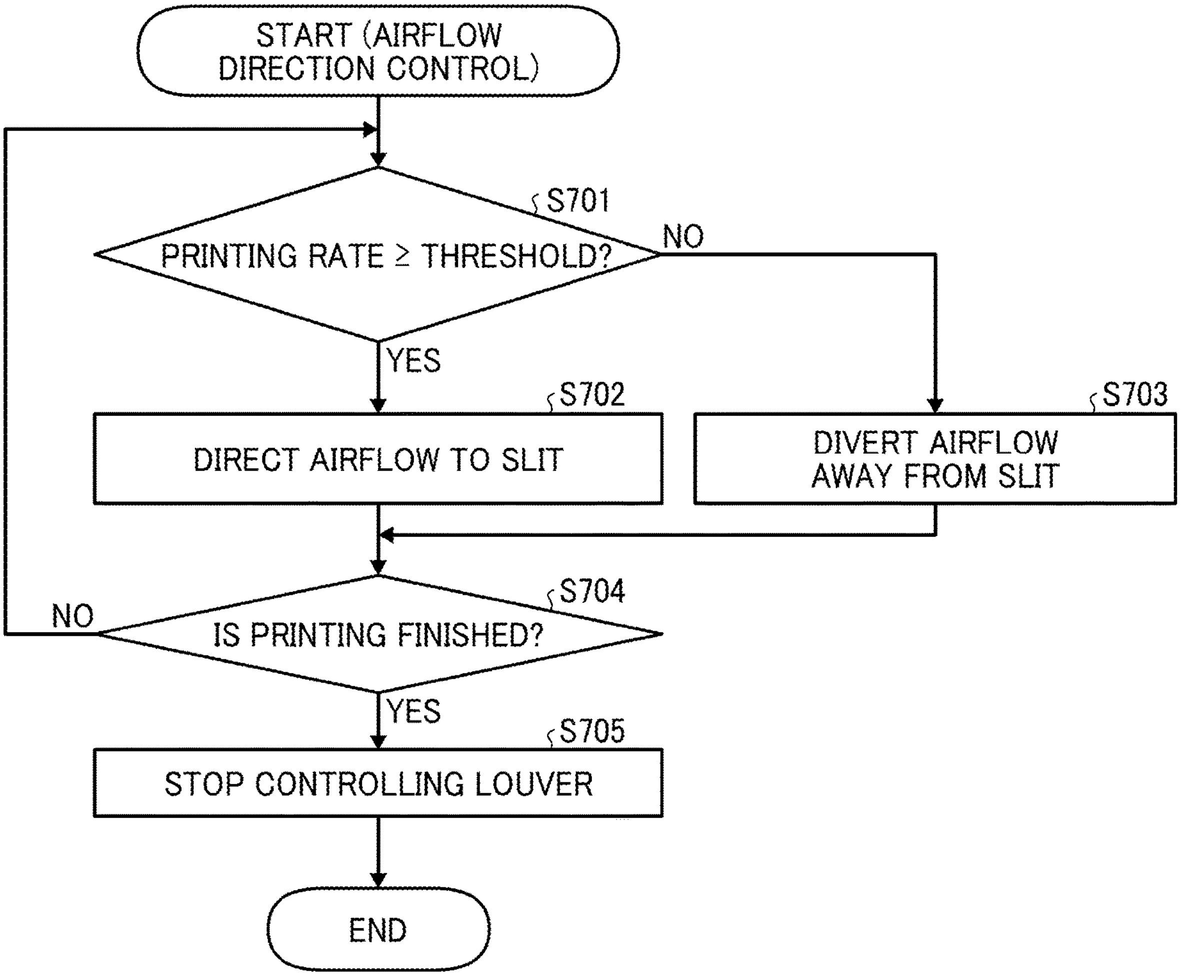
FIG. 7 is a flowchart of an airflow direction control according to an embodiment of the present disclosure.

FIG. 7 is a flowchart of processes of an airflow direction control. The airflow direction control unit 116 compares the printing rate with a predetermined threshold (step S701). When the printing rate is equal to or larger than the threshold (Yes in step S701), the airflow direction control unit 116 directs the airflow generated by the fan 24 toward the slit 27 (step S702). On the other hand, when the printing rate is less than the threshold (No in step S701), the airflow direction control unit 116 diverts the airflow generated by the fan 24 away from the slit 27 (step S703). The airflow direction control unit 116 repeats the processes in steps S701 to S703 to adjust the louver 28 to direct the airflow in the direction set in steps S702 and S703 until the controller 100 finishes the printing on the continuous sheet P (No in step S704). When the controller 100 finishes the printing on the continuous sheet P (Yes in step S704), the airflow direction control unit 116 stops controlling the louver 28 (step S705).

Figure 8:
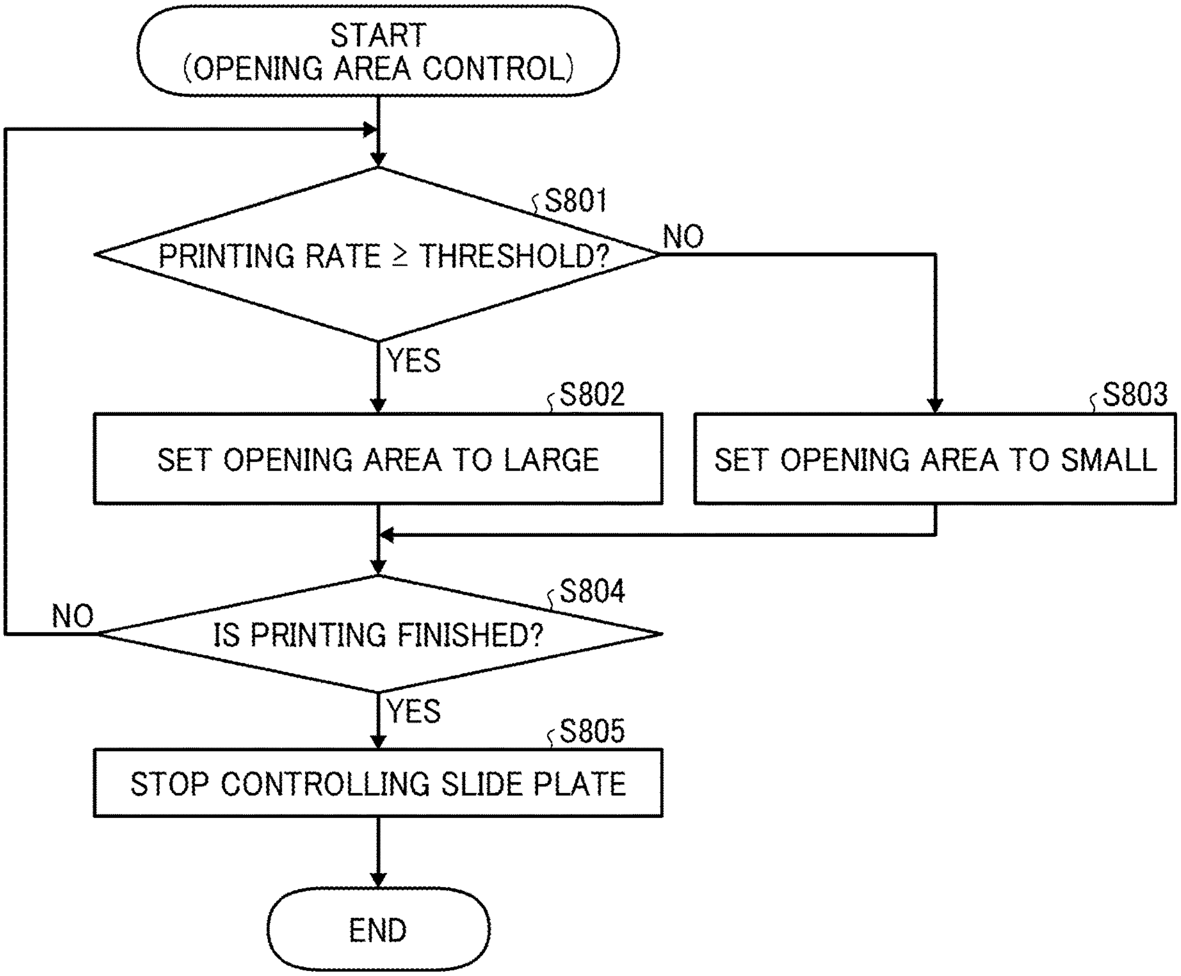
FIG. 8 is a flowchart of an opening area control according to an embodiment of the present disclosure.

FIG. 8 is a flowchart of processes of an opening area control. The opening area control unit 117 compares the printing rate with a predetermined threshold (step S801). When the printing rate is equal to or larger than the threshold (Yes in step S801), the opening area control unit 117 sets an opening area of the slit 27 to "large (i.e., a first opening area)" (step S802). On the other hand, when the printing rate is less than the threshold (No in step S801), the opening area control unit 117 sets the opening area of the slit 27 to "small (i.e., a second opening area)" (step S803). The opening area control unit 117 repeats the processes in steps S801 to S803 to control the slide plate 29 to the position corresponding to the opening area set in steps S802 and S803 until the controller 100 finishes the printing on the continuous sheet P (No in step S804). When the controller 100 finishes the printing on the continuous sheet P (Yes in step S804), the opening area control unit 117 stops controlling the slide plate 29 (step S805).

In step S702, the airflow direction control unit 116 may direct the airflow to portions of the slits 27 surrounding the second discharge heads 23E, 23F, and 23G, for example, toward the portions extending in the width direction on the upstream side of the nozzles N as indicated by thick solid lines in FIG. 3B. In steps S802 and S803, the opening area control unit 117 may control opening areas of portions of the slits 27 surrounding the second discharge heads 23E, 23F, and 23G, for example, the opening areas of the portions extending in the width direction on the upstream side of the nozzles N as indicated by the thick solid lines in FIG. 3B.

When the controller 100 calculates the printing rate of the entire image to be formed on the continuous sheet P, the airflow volume set in steps S602 and S603 in FIG. 6, the airflow direction set in steps S702 and S703 in FIG. 7, and the opening area set in steps S802 and S803 in FIG. 8 are constant from the start to the end of the printing (image formation) on the continuous sheet P. Alternately, the controller 100 may divide the image to be formed on the continuous sheet P in the conveyance direction and calculate the printing rate of each of the divided portions of the image. In this case, the airflow volume set in steps S602 and S603 in FIG. 6, the airflow direction set in steps S702 and S703 in FIG. 7, and the opening area set in steps S802 and S803 in FIG. 8 are changed based on the printing rate corresponding to each of the divided portions from the start to the end of the printing (image formation) on the continuous sheet P.

In an inkjet printer according to a comparative example, ink discharged from an ink discharge unit may be atomized into mist, the mist of the ink may float in the inkjet printer, and the mist carried by an airflow may adhere to an inside of the inkjet printer, thereby staining the inside with the ink. For this reason, a mist collection mechanism is disposed downstream from the ink discharge unit in the conveyance direction to collect the mist, thereby preventing the ink from staining the inside.

In addition, in the inkjet printer, an airflow generated by the medium being conveyed collides with droplets of the ink discharged from the ink discharge unit, thereby disturbing the airflow between the ink discharge unit and the medium. Accordingly, landing positions of the droplets of the ink may be disturbed, causing a curved white streak pattern (hereinafter referred to as "wind ripples") is formed on an image formed on the medium. In another comparative example, an airflow generator is disposed upstream from the ink discharge unit to generate an airflow in a direction opposite to the conveyance direction to prevent the wind ripples.

However, the collected ink is accumulated in the mist collection mechanism, and the mist collection mechanism is maintained regularly to dispose of the accumulated ink. In addition, since the airflow generator is disposed upstream from the ink discharge unit in the conveyance direction, the inkjet printer may increase in size in the conveyance direction.

According to the above-described embodiment of the present disclosure, the following operational effects, for example, are achieved.

According to the above-described embodiment, the fan 24 attached to the housing 22 generates an airflow, and the airflow downwardly flows through the slits 27 disposed in the lower face 22B of the housing 22 toward the conveyance path. Accordingly, ink discharged from the discharge head 23 lands on the continuous sheet P before the ink is atomized into mist. As a result, the inkjet printer 1 according to the above-described embodiment prevents the mist of the ink from staining the inside of the inkjet printer 1 without the maintenance and prevents the inkjet printer 1 from increasing in size. Further, according to the above-described embodiment, the wind ripples can be prevented.

According to the above-described embodiment, the fan 24 is disposed directly above the discharge heads 23A to 23G. As a result, in particular, the ink discharge unit 20 is prevented from increasing in size in the conveyance direction. According to the above-described embodiment, the slits 27 surround the respective discharge heads 23A to 23G. As a result, the slits 27 can level an effect of preventing the mist generation for each of the discharge heads 23A to 23G.

According to the above-described embodiment, the fans 24A and 24C function as the positive pressure generator, and the fan 24B functions as the negative pressure generator. This configuration can circulate an air in the internal space of the housing 22 while maintaining the air inside the housing 22 at a positive pressure. Thus, the discharge heads 23A to 23G can be efficiently cooled.

According to the above-described embodiment, the airflow volume (see FIG. 6), the airflow direction (see FIG. 7), and the opening area (see FIG. 8) are changed according to the printing rate. This control can enhance an intensity of the downward airflow to prevent the mist generation when the amount of ink discharged from the nozzle N is large. In addition, this control can weaken the intensity of the downward airflow to prevent the droplets of the ink from deviating from desired landing positions on the continuous sheet P when the amount of ink discharged from the nozzle N is small. The controller 100 may execute all of the processes illustrated in FIGS. 6, 7, and 8 in parallel or may execute only a part of the processes.

In particular, the wind ripples are likely to occur at the portions indicated by the thick solid lines in FIG. 3B (that is, the positions on the upstream side of the second discharge heads 23E to 23G in the conveyance direction). Therefore, according to the above-described embodiment, the airflow direction control and the opening area control intensively concentrate on these portions, thereby efficiently preventing the wind ripples.

An air current flowing in the conveyance direction (hereinafter, referred to as a "conveyance airflow") is generated in the conveyance path as the continuous sheet P moves. Therefore, the slit 27 is disposed upstream from the nozzles N in the conveyance direction to generate the downward airflow through the slit 27, thereby reducing the conveyance airflow reaching the positions of the nozzles N in the conveyance direction. As a result, the ink discharged from the nozzles N can be prevented from being atomized into mist, and the droplets of the ink can be prevented from deviating from the desired landing positions on the continuous sheet P.

Modification

Figure 9A:
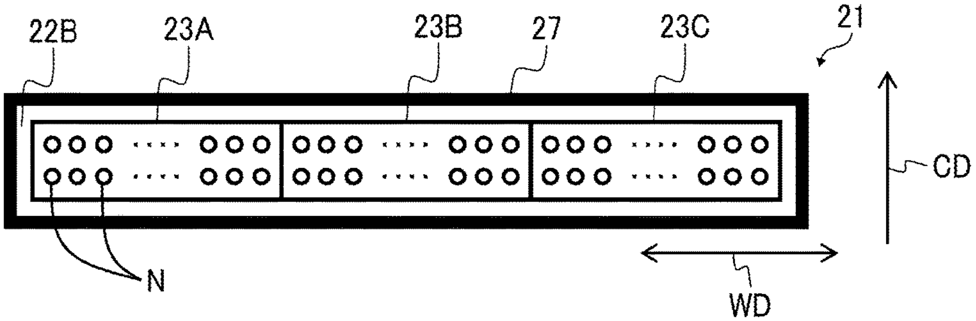
FIGS. 9A to 9D are diagrams illustrating other examples of a layout of nozzles and a slit of the line head.
Figure 9B:
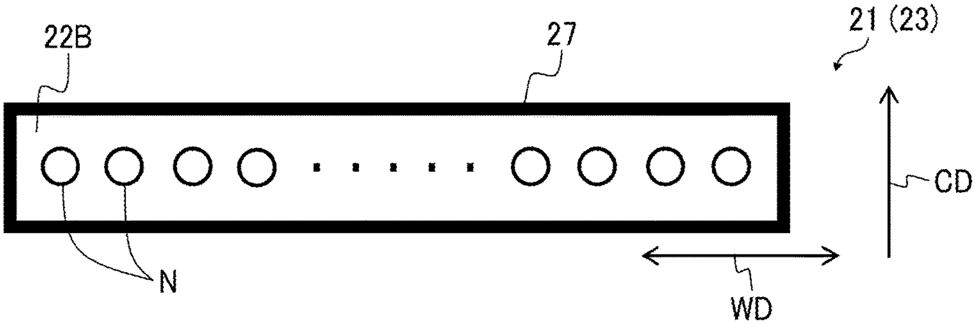
Figure 9C:
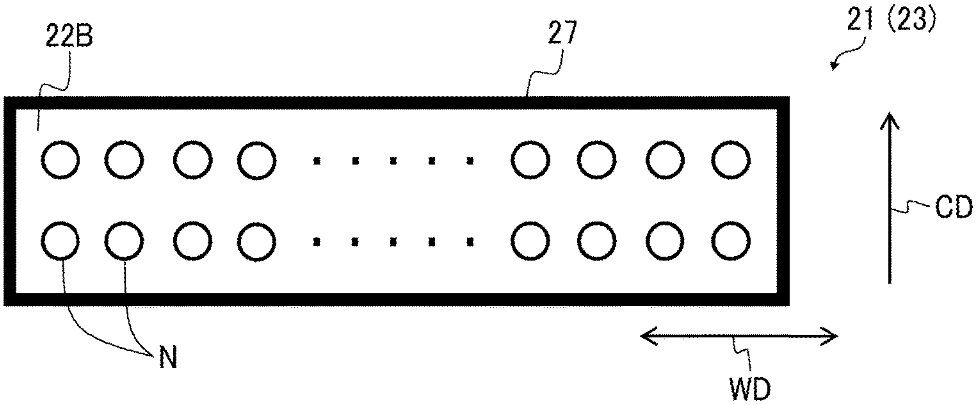
Figure 9D:
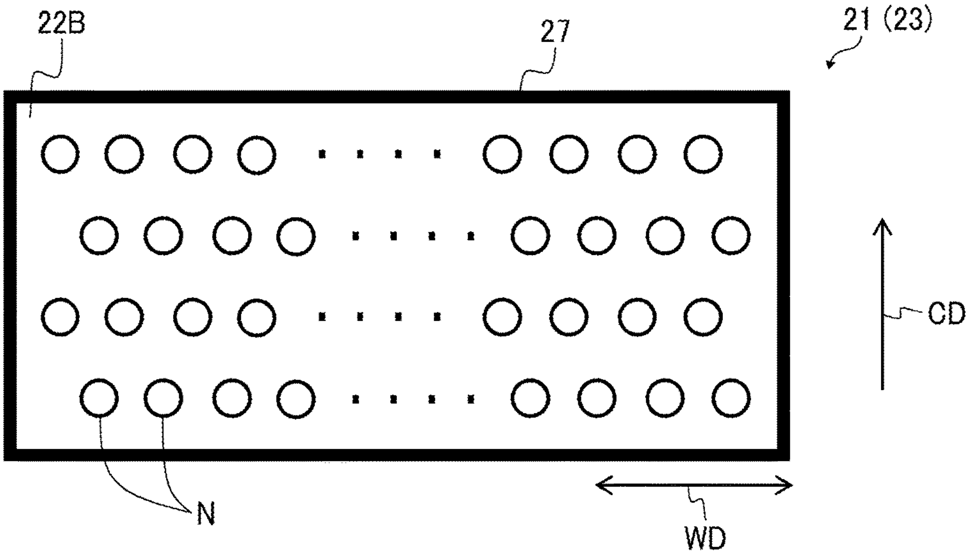
Figure 10A:
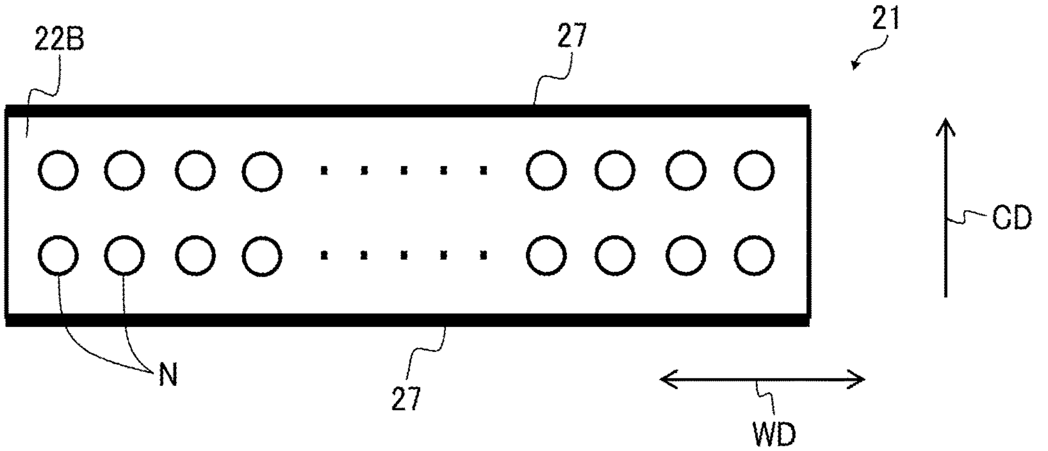
FIGS. 10A to 10C are diagrams illustrating yet other examples of the layout of the nozzles and the slit.
Figure 10B:
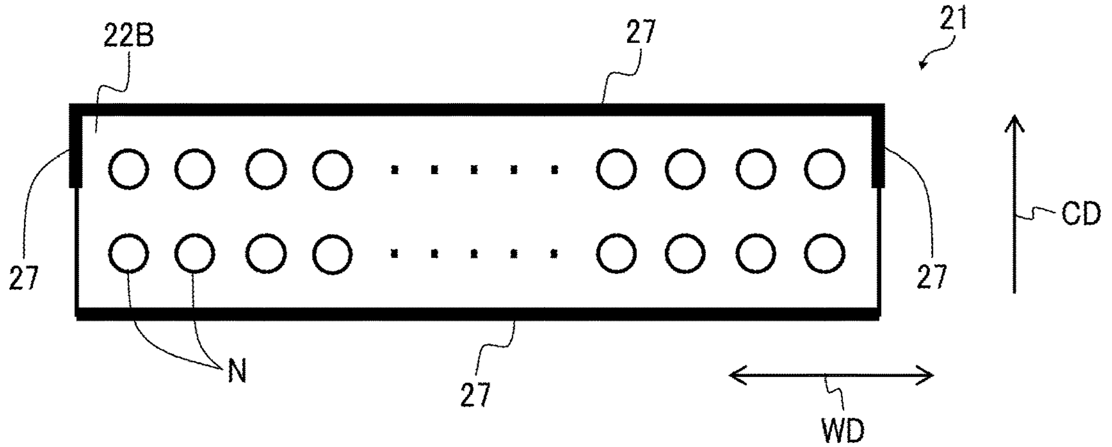
Figure 10C:
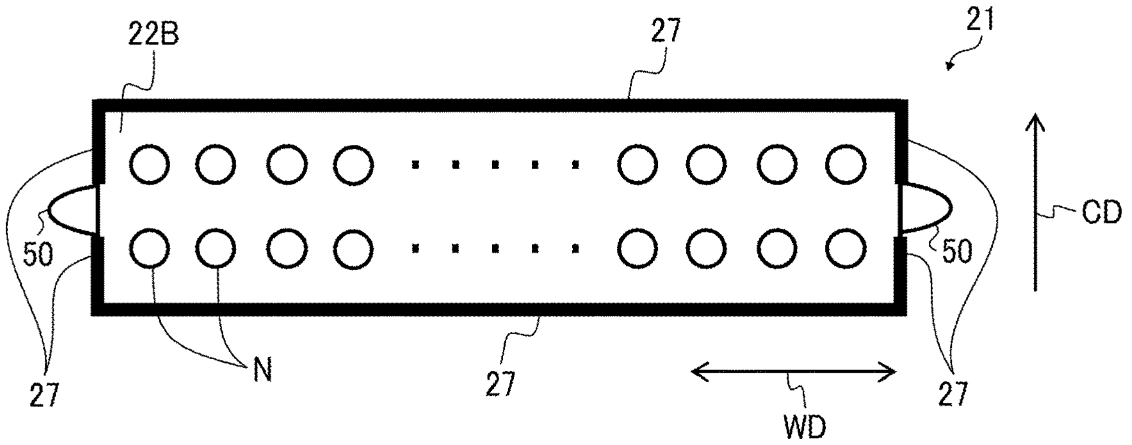

The layout of the nozzles N and the slits 27 in the lower face 22B of the housing 22 is not limited to the examples illustrated in FIGS. 3A and 3B. Other examples of the layout of the nozzles N and the slits 27 are described with reference to FIGS. 9A to 10C. FIGS. 9A to 9D are diagrams illustrating other examples of the layout of the nozzles N and the slits 27. FIGS. 10A to 10C are diagrams illustrating yet other examples of the layout of the nozzles N and the slits 27. Detailed descriptions are omitted of common features of the above-described embodiment and the present modification. The following description concentrates on the differences between the above-described embodiment and the present modification.

The discharge heads 23A to 23G may not be arranged in the staggered manner as illustrated in FIGS. 3A and 3B. In another example, as illustrated in FIG. 9A, the multiple discharge heads 23A to 23C may be arranged in the width direction in a row in the lower face 22B of the housing 22. The number of the discharge heads 23A to 23C is not limited to three as in the example illustrated in FIG. 9A.

The line head 21 may not include the multiple discharge heads 23A to 23G each of which is unitized as a single unit as illustrated in FIGS. 2B to 3B. In still another example, the line head 21 may include one discharge head 23 in which all the nozzles N exposed from the lower face 22B of the housing 22 are controlled as illustrated in FIGS. 9B to 9D. At this time, the number of rows of the multiple nozzles N may be one as illustrated in FIG. 9B or may be plural in the conveyance direction as illustrated in FIGS. 9C and 9D. Each row in which the multiple nozzles N are arranged in the width direction in a row is referred to as a "nozzle row." The nozzle rows adjacent to each other in the conveyance direction may be arranged at positions shifted from each other in the width direction as illustrated in FIG. 9D.

The slit 27 may not surround each of the multiple discharge heads 23A to 23G as illustrated in FIGS. 3A and 3B. In still another example, the slit 27 may have a single frame shape surrounding all the nozzles N disposed in the lower face 22B of the housing 22 as indicated by thick solid lines in FIGS. 9A to 9D. In other words, the slit 27 may be disposed along the outer periphery of the lower face 22B of the housing 22 so as to surround the multiple nozzles N.

The slit 27 may not have a frame shape that is continuous along the outer periphery of the lower face 22B of the housing 22 as illustrated in FIGS. 9A to 9D. In yet another example, as indicated by thick solid lines in FIG. 10A, the slits 27 may be disposed on an upstream side and a downstream side of the outer periphery of the lower face 22B of the housing 22. The upstream side is disposed upstream from the nozzles N in the conveyance direction and extends in the width direction. The downstream side is disposed downstream from the nozzles N in the conveyance direction and extends in the width direction. In addition to the arrangement illustrated in FIG. 10A, as illustrated by thick solid lines in FIG. the slits 27 may be disposed on at least a part of both sides of the outer periphery of the lower face 22B of the housing 22. Both the sides are disposed outboard of the nozzles N in the width direction and extend in the conveyance direction. More specifically, as indicated by thick solid lines in FIG. 10C, when attachments 50 for attaching the ink discharge unit 20 to the frame of the inkjet printer 1 are disposed at both ends of the housing 22 in the width direction, the slits 27 may be disposed at positions different from the attachments 50 on the sides disposed outboard of the nozzles N in the width direction and extending in the conveyance direction.

As another example of the control illustrated in FIG. 6, the airflow volume control unit 115 may compare the conveyance speed of the conveyor 10 with a predetermined threshold in step S601. When the conveyance speed is equal to or larger than the threshold (Yes in step S601), the airflow volume control unit 115 may set the airflow volume of the fan 24 to "high (i.e., the first airflow volume)" (step S602). On the other hand, when the conveyance speed is less than the threshold (No in step S601), the airflow volume control unit 115 may set the airflow volume of the fan 24 to "low (i.e., the second airflow volume)" (step S603).

As another example of the control illustrated in FIG. 7, the fan 24 may be attached to the housing 22 so as to fix a direction of the airflow generated by the fan 24 toward the slit 27. As still another example, the louver 28 may be fixed so as to constantly direct the airflow generated by the fan 24 toward the slit 27.

In the above-described embodiment and modification, the multiple nozzles N are arranged in the width direction on the lower face 22B of the housing 22. The multiple nozzles N face the entire area of the continuous sheet P in the width direction in a so-called "line head printer." However, the present disclosure can be applied not only to the line head printer but also to a "serial head printer" in which a carriage on which a discharge head is mounted moves in the width direction (main scanning direction).

The "liquid discharge apparatus" may further include devices relating to feeding, conveying, and ejecting of the material onto which liquid can adhere and also include a pretreatment device and an aftertreatment device.

The "liquid discharge apparatus" may be, for example, an image forming apparatus to form an image on a sheet by discharging ink, or a three-dimensional apparatus to discharge fabrication liquid to a powder layer in which powder material is formed in layers, so as to form a three-dimensional object.

The "liquid discharge apparatus" is not limited to an apparatus that discharges liquid to visualize meaningful images such as letters or figures. For example, the liquid discharge apparatus may be an apparatus that forms meaningless images such as meaningless patterns or an apparatus that fabricates three-dimensional images.

The above-described term "material onto which liquid can adhere" represents a material on which liquid is at least temporarily adhered, a material on which liquid is adhered and fixed, or a material into which liquid is adhered to permeate. Specific examples of the "material onto which liquid can adhere" include, but are not limited to, a recording medium such as a paper sheet, recording paper, a recording sheet of paper, a film, or cloth, an electronic component such as an electronic substrate or a piezoelectric element, and a medium such as layered powder, an organ model, or a testing cell. The "material onto which liquid can adhere" includes any material to which liquid adheres, unless particularly limited.

Examples of the "material onto which liquid can adhere" include any materials to which liquid can adhere even temporarily, such as paper, thread, fiber, fabric, leather, metal, plastic, glass, wood, and ceramic.

Further, the term "liquid" is not limited to a particular liquid and includes any liquid having a viscosity or a surface tension that can be discharged from the head. However, preferably, the viscosity of the liquid is not greater than 30 mPa·s under ordinary temperature and ordinary pressure or by heating or cooling. Examples of the liquid include a solution, a suspension, or an emulsion including, for example, a solvent, such as water or an organic solvent, a colorant, such as dye or pigment, a functional material, such as a polymerizable compound, a resin, or a surfactant, a biocompatible material, such as DNA, amino acid, protein, or calcium, and an edible material, such as a natural colorant. Such a solution, a suspension, or an emulsion can be used for, e.g., inkjet ink; surface treatment liquid; a liquid for forming an electronic element component, a light-emitting element component, or an electronic circuit resist pattern; or a material solution for three-dimensional fabrication.

The liquid discharge apparatus may be an apparatus to relatively move the liquid discharge head and the material onto which liquid can adhere. However, the liquid discharge apparatus is not limited to such an apparatus. For example, the liquid discharge apparatus may be a serial head apparatus that moves the liquid discharge head or a line head apparatus that does not move the liquid discharge head.

Examples of the liquid discharge apparatus further include: a treatment liquid applying apparatus that discharges a treatment liquid onto a paper sheet to apply the treatment liquid to the surface of the paper sheet, for reforming the surface of the paper sheet; and an injection granulation apparatus that injects a composition liquid, in which a raw material is dispersed in a solution, through the nozzle N to granulate fine particle of the raw material.

The control method described above may be implemented by, for example, a program. For example, the control method may be executed by a computer causing an arithmetic device, a storage device, an input device, an output device, and a control device to operate in cooperation with each other based on a program. The program may be written in, for example, a storage device or a storage medium and distributed, or may be distributed through, for example, an electric communication line.

Each of functions of the above-described embodiments executed by the controller 100 can be implemented by one or more processing circuits. Here, the "processing circuit" in the present specification includes a processor programmed to execute each function by software like a processor implemented by an electronic circuit, and a device such as an application specific integrated circuit (ASIC), a digital signal processor (DSP), a field programmable gate array (FPGA), or a conventional circuit module designed to execute each function described above.

Embodiments of the present disclosure are not limited to the above-described embodiments, and various modifications and variations can be made without departing from the technical scope of the present disclosure. It is therefore to be understood that the disclosure of this patent specification may be practiced otherwise by those skilled in the art than as specifically described herein, and such, modifications, alternatives are within the technical scope of the appended claims. Such modifications are also included in the technical scope of the present disclosure.

Aspects of the present disclosure are, for example, as follows.

Aspect 1

A liquid discharge apparatus includes a conveyance path, a conveyor, and a liquid discharger. The conveyor conveys a medium in a conveyance direction along the conveyance path. The liquid discharger is disposed above the conveyance path to discharge a liquid toward the medium conveyed by the conveyor. The liquid discharger includes a discharge head, a housing, an airflow generator, and slit. The discharge head has a nozzle from which the liquid is discharged. The housing accommodates the discharge head. The housing has a lower face from which the nozzle of the discharge head is exposed and a slit adjacent to the discharge head in the lower face of the housing. The airflow generator generates an airflow flowing through the housing and discharged from the slit toward the conveyance path.

Aspect 2

In Aspect 1, the housing has multiple slits extending in a width direction orthogonal to the conveyance direction in the lower face. The multiple slits has a first slit on an upstream side of the discharge head in the conveyance direction and a second slit on a downstream side of the discharge head in the conveyance direction.

Aspect 3

In Aspect 2, the multiple slits has a third slit on at least a part of both sides of the discharge head in the width direction, and the third slit extends in the conveyance direction.

Aspect 4

In any one of Aspects 1 to 3, the liquid discharger further includes an opening area adjuster to adjust an opening area of the slit.

Aspect 5

In any one of Aspects 1 to 4, the airflow generator is attached to the housing above the discharge head.

Aspect 6

In any one of Aspects 1 to 5, the airflow generator includes a positive pressure generator that generates the airflow to increase an inner pressure inside the housing and a negative pressure generator that generates the airflow to decrease the inner pressure.

Aspect 7

In Aspect 6, the airflow generator further includes another positive pressure generator. The positive pressure generator and said another positive pressure generator are separated from each other in a width direction orthogonal to the conveyance direction. The negative pressure generator is between the positive pressure generator and said another positive pressure generator in the width direction.

Aspect 8

In any one of Aspects 1 to 7, the liquid discharger includes multiple discharge heads including the discharge head. The discharge head has multiple nozzles including the nozzle. The multiple discharge heads includes multiple first discharge heads spaced apart from each other in a width direction orthogonal to the conveyance direction and multiple second discharge heads disposed downstream from the multiple first discharge heads in the conveyance direction. The multiple second discharge heads are spaced apart from each other in the width direction, and each of the multiple second discharge heads is disposed between adjacent two of the multiple first discharge heads in the width direction. The housing has multiple slits including the slit in the lower face. The multiple slits respectively surrounds peripheries of the multiple nozzles of the multiple discharge heads.

Aspect 9

In any one of Aspects 1 to 8, the liquid discharge apparatus further includes circuitry to control an intensity of the airflow generated by the airflow generator. The circuitry causes the airflow generator to generate the airflow having a first airflow volume in response to an amount of the liquid discharged from the nozzle toward the medium being equal to or larger than a threshold and generate the airflow having a second airflow volume smaller than the first airflow volume in response to the amount of the liquid being smaller than the threshold.

Aspect 10

In any one of Aspects 1 to 9, the liquid discharge apparatus further includes circuitry to control an intensity of the airflow generated by the airflow generator. The circuitry further causes the airflow generator to generate the airflow having a first airflow volume in response to a conveyance speed of the conveyor being equal to or larger than a threshold and generate the airflow having a second airflow volume smaller than the first airflow volume in response to the conveyance speed of the conveyor being smaller than the threshold.

Aspect 11

In any one of Aspects 1 to 10, the liquid discharge apparatus further includes circuitry to control a direction of the airflow generated by the airflow generator. The circuitry directs the airflow toward the slit in response to an amount of the liquid discharged from the nozzle toward the medium being equal to or larger than a threshold, and divert the airflow away from the slit in response to the amount of the liquid being smaller than the threshold.

Aspect 12

In any one of Aspects 1 to 10, a direction of the airflow is fixed to flow toward the slit.

Aspect 13

In Aspect 4, the liquid discharge apparatus further includes circuitry to control the opening area adjuster. The circuitry further causes the opening area adjuster to adjust the opening area of the slit to a first opening area in response to an amount of the liquid discharged from the nozzle toward the medium being equal to or larger than a threshold, and adjust the opening area of the slit to a second opening area smaller than the first opening area in response to the amount of the liquid being smaller than the threshold.

Aspect 14

In any one of Aspects 1 to 13, the discharge head further has multiple nozzles including the nozzle. The multiple nozzles are arranged on the lower face of the housing in a width direction orthogonal to the conveyance direction to face a recording area, onto which an image is formed, of the medium conveyed by the conveyor.

As described above, according to the present disclosure, the liquid discharge apparatus that discharges a liquid (e.g., ink) toward a medium can prevent the apparatus from increasing in size while preventing the mist of the liquid from staining the inside of the apparatus without the maintenance.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A liquid discharge apparatus comprising:
- a conveyance path;
- a conveyor configured to convey a medium in a conveyance direction along the conveyance path; and
- a liquid discharger disposed above the conveyance path and configured to discharge a liquid toward the medium conveyed by the conveyor, the liquid discharger including:
  - a discharge head having a nozzle from which the liquid is discharged;
  - a housing accommodating the discharge head, the housing having:
    - a lower face from which the nozzle of the discharge head is exposed; and
    - a slit adjacent to the discharge head in the lower face of the housing; and
  - an airflow generator configured to generate an airflow flowing through the housing and discharged from the slit toward the conveyance path.

2. The liquid discharge apparatus according to claim 1,
- wherein the housing has multiple slits extending in a width direction orthogonal to the conveyance direction in the lower face, and
- the multiple slits has:
  - a first slit on an upstream side of the discharge head in the conveyance direction; and
  - a second slit on a downstream side of the discharge head in the conveyance direction.

3. The liquid discharge apparatus according to claim 2,
- wherein the multiple slits has a third slit on at least a part of both sides of the discharge head in the width direction, and
- the third slit extends in the conveyance direction.

4. The liquid discharge apparatus according to claim 1,
- wherein the liquid discharger further includes an opening area adjuster configured to adjust an opening area of the slit.

5. The liquid discharge apparatus according to claim 4, further comprising circuitry configured to control the opening area adjuster,
- wherein the circuitry is further configured to cause the opening area adjuster to:
  - adjust the opening area of the slit to a first opening area in response to an amount of the liquid discharged from the nozzle toward the medium being equal to or larger than a threshold; and
  - adjust the opening area of the slit to a second opening area smaller than the first opening area in response to the amount of the liquid being smaller than the threshold.

6. The liquid discharge apparatus according to claim 1,
- wherein the airflow generator is attached to the housing above the discharge head.

7. The liquid discharge apparatus according to claim 1,
- wherein the airflow generator includes:
  - a positive pressure generator configured to generate the airflow to increase an inner pressure inside the housing; and
  - a negative pressure generator configured to generate the airflow to decrease the inner pressure.

8. The liquid discharge apparatus according to claim 7,
- wherein the airflow generator further includes another positive pressure generator,
- the positive pressure generator and said another positive pressure generator are separated from each other in a width direction orthogonal to the conveyance direction, and
- the negative pressure generator is between the positive pressure generator and said another positive pressure generator in the width direction.

9. The liquid discharge apparatus according to claim 1,
- wherein the liquid discharger includes multiple discharge heads including the discharge head,
- the discharge head has multiple nozzles including the nozzle,
- the multiple discharge heads includes:
  - multiple first discharge heads spaced apart from each other in a width direction orthogonal to the conveyance direction; and
  - multiple second discharge heads disposed downstream from the multiple first discharge heads in the conveyance direction, the multiple second discharge heads spaced apart from each other in the width direction, and each of the multiple second discharge heads disposed between adjacent two of the multiple first discharge heads in the width direction, and the housing has multiple slits including the slit in the lower face, the multiple slits respectively surrounding peripheries of the multiple nozzles of the multiple discharge heads.

10. The liquid discharge apparatus according to claim 1, further comprising circuitry configured to control an intensity of the airflow generated by the airflow generator, wherein the circuitry is further configured to cause the airflow generator to:

generate the airflow having a first airflow volume in response to an amount of the liquid discharged from the nozzle toward the medium being equal to or larger than a threshold; and generate the airflow having a second airflow volume smaller than the first airflow volume in response to the amount of the liquid being smaller than the threshold.

11. The liquid discharge apparatus according to claim 1, further comprising circuitry configured to control an intensity of the airflow generated by the airflow generator, wherein the circuitry is further configured to cause the airflow generator to:

generate the airflow having a first airflow volume in response to a conveyance speed of the conveyor being equal to or larger than a threshold; and generate the airflow having a second airflow volume smaller than the first airflow volume in response to the conveyance speed of the conveyor being smaller than the threshold.

12. The liquid discharge apparatus according to claim 1, further comprising circuitry configured to control a direction of the airflow generated by the airflow generator, wherein the circuitry is further configured to:

direct the airflow toward the slit in response to an amount of the liquid discharged from the nozzle toward the medium being equal to or larger than a threshold; and divert the airflow away from the slit in response to the amount of the liquid being smaller than the threshold.

13. The liquid discharge apparatus according to claim 1, wherein a direction of the airflow is fixed to flow toward the slit.

14. The liquid discharge apparatus according to claim 1, wherein the discharge head further has multiple nozzles including the nozzle, and the multiple nozzles are arranged on the lower face of the housing in a width direction orthogonal to the conveyance direction to face a recording area, onto which an image is formed, of the medium conveyed by the conveyor.

* * * * *